United States Patent [19]

Lupke et al.

[11] 4,141,576

[45] Feb. 27, 1979

[54] HEAT SHRINKABLE SLEEVE FOR COUPLING PIPE SECTIONS

[76] Inventors: Manfred A. A. Lupke, 35 Ironshield Crescent; Gerd P. H. Lupke, 46 Stornoway Crescent, both of Thornhill, Ontario, Canada

[21] Appl. No.: 866,028

[22] Filed: Dec. 30, 1977

Related U.S. Application Data

[63] Continuation-in-part of Ser. No. 827,431, Aug. 23, 1977, abandoned.

[51] Int. Cl.² ............................................ F16L 47/00
[52] U.S. Cl. .................................... 285/369; 285/381; 285/DIG. 4; 285/DIG. 10
[58] Field of Search ................. 285/381, DIG. 4, 236, 285/235, DIG. 10, 369; 174/DIG. 8

[56] References Cited

U.S. PATENT DOCUMENTS

| | | | |
|---|---|---|---|
| 3,177,015 | 4/1965 | Brown | 285/236 |
| 3,315,986 | 4/1967 | Quick | 285/381 X |
| 3,320,355 | 5/1967 | Booker | 285/381 X |
| 3,453,006 | 7/1969 | Levake | 285/235 X |
| 3,544,672 | 12/1970 | Goda et al. | 285/381 |
| 3,558,164 | 1/1971 | Havell | 285/236 |
| 3,567,259 | 3/1971 | Benson et al. | 285/381 |
| 3,588,150 | 6/1971 | Wold | 285/381 |
| 3,633,947 | 1/1972 | Nelson | 285/236 X |

FOREIGN PATENT DOCUMENTS

| | | | |
|---|---|---|---|
| 2145831 | 3/1973 | Fed. Rep. of Germany | 285/381 |
| 2204165 | 5/1973 | Fed. Rep. of Germany | 285/381 |
| 2321315 | 3/1975 | Fed. Rep. of Germany | 285/236 |
| 7512564 | 4/1977 | Netherlands | 285/381 |
| 1394219 | 5/1975 | United Kingdom | 285/381 |

*Primary Examiner*—Thomas F. Callaghan
*Attorney, Agent, or Firm*—Ridout & Maybee

[57] ABSTRACT

Pipe sections are coupled end to end by shrinking a heat shrinkable sleeve in frictional engagement with the end portions of the pipe sections. In a preferred application of the invention, the pipe sections are corrugated and the sleeve conforms to the corrugated surfaces thereof providing a sound mechanical interlock.

9 Claims, 10 Drawing Figures

HEAT SHRINKABLE SLEEVE FOR COUPLING PIPE SECTIONS

CROSS REFERENCE TO RELATED APPLICATION

This application is a continuation-in-part of our application Ser. No. 827,431 filed Aug. 23, 1977 for Pipe Joints and Pipe Coupling Method and now abandoned.

FIELD OF THE INVENTION

This invention relates to pipe joints and to methods of coupling pipe sections to form pipe joints. It is an object of the invention to provide an improved method of coupling pipe sections using a heat shrinkable sleeve.

SUMMARY OF THE INVENTION

According to the invention, a method of coupling pipe sections comprises aligning the pipe sections end to end within a heat shrinkable sleeve overlapping the adjacent end portions of the sections and shrinking the sleeve into frictional engagement with said end portions.

By a "heat shrinkable sleeve" is meant a tubular body of thermoplastic material having an elastic memory, the body being in a heat-unstable stretched state so that, when heated, it shrinks to relieve the stresses introduced by stretching. Heat shrinkable sleeves are well known and have been used in numerous applications other than making pipe joints. As applied to pipe joints, heat shrinkable sleeves are found to offer a very simple and efficient coupling device for pipe sections, and more especially when at least one of the pipe sections has a corrugated exterior surface to which the sleeve conforms when shrunk onto it so as to provide a mechanical interlock between the engaging parts.

BRIEF DESCRIPTION OF THE DRAWINGS

In order that the invention may be readily understood, exemplary embodiments of the invention will now be described with reference to the accompanying drawing, in which.

DESCRIPTION OF THE PREFERRED EMBODIMENTS

Figure 1:
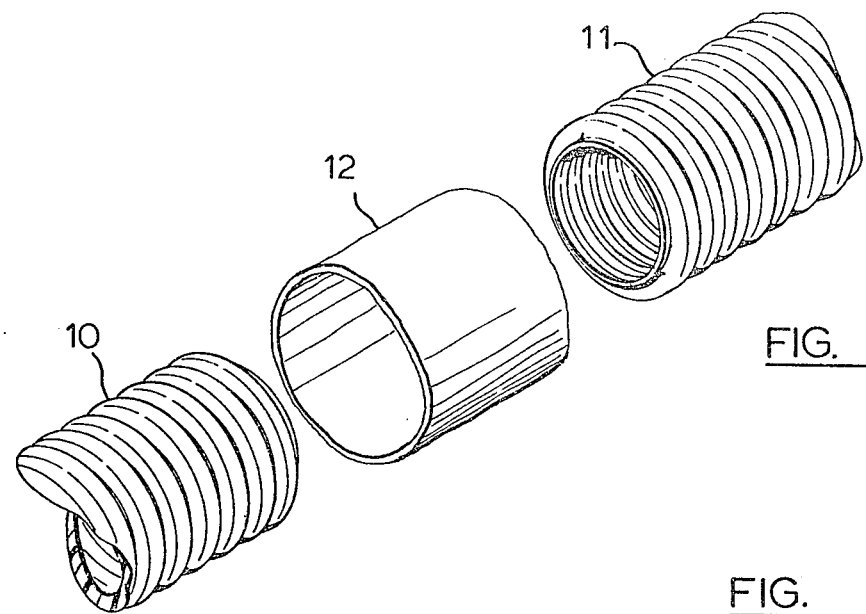
FIG. 1 is an exploded perspective view showing two pipe sections to be coupled, with a sleeve to complete the joint.

The pipe sections to be coupled may be of metal or of thermoplastic material, and may be smooth walled or corrugated. For the purpose of the present description the pipe sections described are of thermoplastic material and are corrugated as shown in the drawings.

Referring to FIG. 1, there are shown a pair of pipe sections 10, 11 and a heat shrinkable sleeve 12. To couple the pipe sections they are aligned end to end, the sleeve 12 overlapping the end portions of the pipe sections. The sleeve is heated so as to shrink to its stable state, the sleeve frictionally engaging the exterior corrugated surfaces of the end portions. An important feature of this embodiment of the invention is that the sleeve conforms to the corrugated surfaces of the pipe sections when it is shrunk, and so itself becomes corrugated, the corrugations of the sleeve registering with the corrugations of the pipe sections and mechanically interlocking with them. To strengthen the joint further, and to provide a seal between the engaging surfaces of the pipe sections, the pipe end portions or the interior of the sleeve may be first coated with a suitable adhesive.

Figure 2:
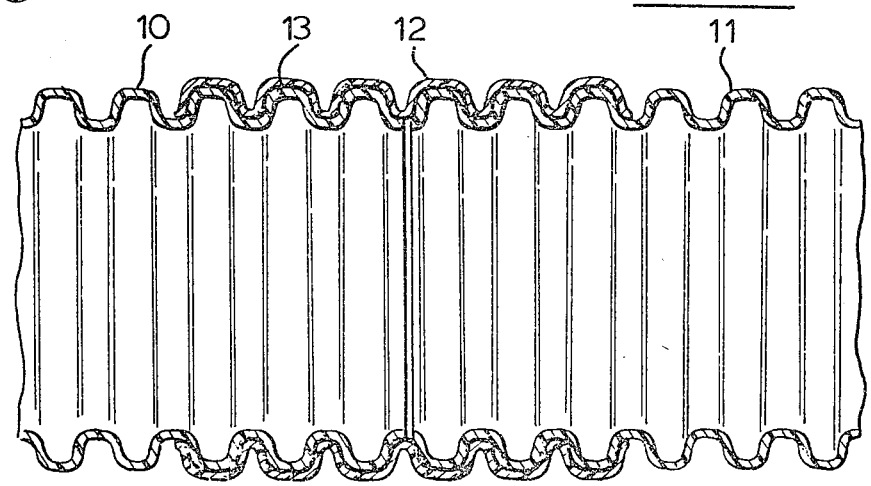
FIG. 2 is a longitudinal sectional view of a pipe joint in accordance with the invention.

FIG. 2 illustrates a pipe joint formed in this manner. The pipe sections 10, 11 are aligned end to end and coupled together by means of the sleeve 12. A layer of adhesive 13 is interposed between the engaging surfaces.

Figure 3:
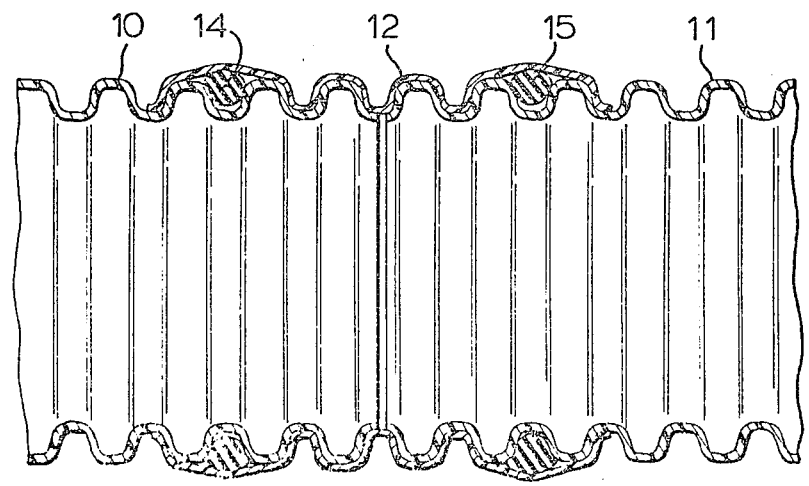
FIG. 3 is a longitudinal sectional view of another pipe joint in accordance with the invention.

FIG. 3 illustrates a variant in which O-rings 14, 15, to provide seals, are located on the corrugated end portions of the pipe sections between adjacent corrugations thereof and clamped between the end portions and the sleeve 12.

Figure 4:
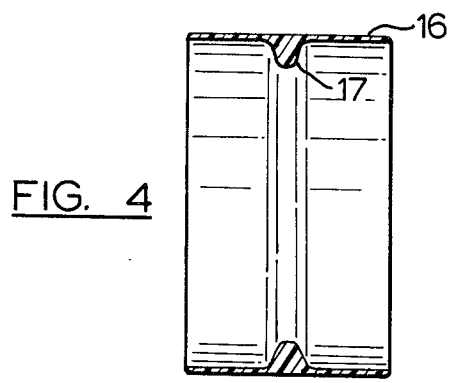
FIG. 4 is a longitudinal sectional view of an auxiliary sleeve used in a third pipe joint according to the invention.
Figure 5:
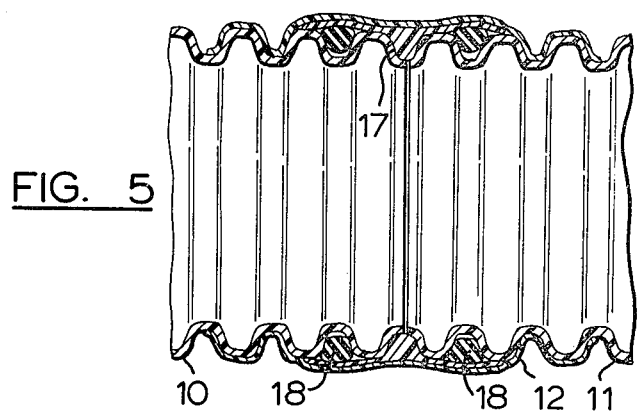
FIG. 5 is a longitudinal sectional view of the third pipe joint.

FIG. 4 illustrates an auxiliary sleeve of thermoplastic material, which may be heat shrinkable, used to align the ends of corrugated pipe sections prior to forming the pipe joint illustrated in FIG. 5. The auxiliary sleeve comprises an outer cylindrical portion 16 of relatively hard material to support the ends of the pipe sections 10, 11 and so provide resistance to shearing forces, and an internal annular portion 17 of relatively soft material which engages the ends of the pipe sections 10, 11 to provide a seal at the join. Additional seals may be provided by means of silicon-rubber O-rings 18, and the joint is completed by applying a heat shrinkable sleeve 12 in the manner described above in relation to the preceding embodiments of the invention.

Figure 6:
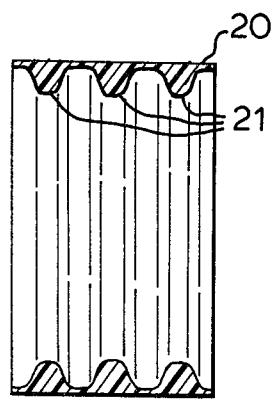
FIG. 6 is a longitudinal sectional view of another auxiliary sleeve used in a fourth pipe joint according to the invention.
Figure 7:
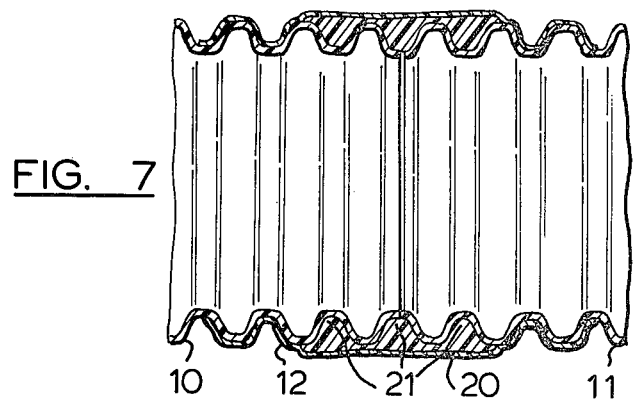
FIG. 7 is a longitudinal sectional view of the fourth pipe joint.

The additional seals may be integral with the auxiliary sleeve. Thus, the sleeve illustrated in FIG. 6 comprises an outer cylindrical portion 20 having three internal integral annular portions 21. The outer portion 20 is of relatively hard thermoplastic material, while the annular portions 21 may be of a softer material which deforms under pressure to provide seals. A pipe joint in which this auxiliary sleeve is used is illustrated in FIG. 7, wherein 10 and 11 denote the corrugated pipe sections, 20 denotes the auxiliary sleeve having the annular projections 21, and 12 denotes the heat shrinkable outer sleeve.

Figure 8:
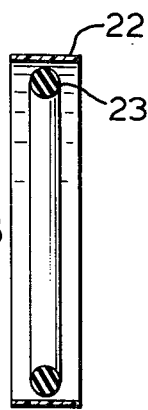
FIG. 8 is a longitudinal sectional view of an auxiliary sleeve and sealing ring used in a fifth pipe joint according to the invention.
Figure 9:
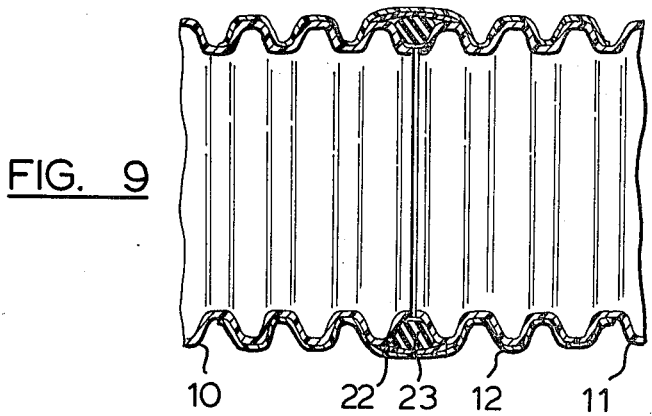
FIG. 9 is a longitudinal sectional view of the fifth pipe joint.

The embodiment illustrated in FIGS. 8 and 9 employs an auxiliary sleeve 22 of relatively hard thermoplastic material which is heat shrinkable and a separate sealing ring 23 which is preferably of silicon rubber.

Figure 10:
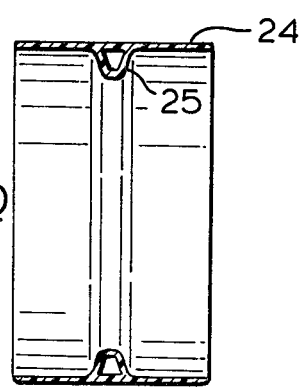
FIG. 10 is a view corresponding to FIG. 4 of a modified auxiliary sleeve.

FIG. 10 illustrates an auxiliary sleeve which is very similar to the sleeve shown in FIG. 4, having an outer cylindrical portion 24 of relatively hard thermoplastic material, which may be heat shrinkable, but an integral internal annular portion 25 which, instead of being solid, is hollow so as to deform under pressure and so provide a seal at the join of the pipe sections.

What we claim is:

1. A pipe joint comprising a pair of corrugated pipe sections aligned end to end, said pipe sections having respective adjacent end portions located within an auxiliary sleeve of relatively hard thermoplastic material adapted to resist shearing forces tending to misalign the end portions of the pipe sections, a sealing ring located within the auxiliary sleeve and positioned to provide a seal at the join between the ends of the pipe sections, and an outer heat shrinkable sleeve shrunk into frictional engagement with said end portions and conforming to the corrugations of said end portions and interlocking therewith, the auxiliary sleeve and sealing ring being clamped between the outer sleeve and said end portions.

2. A pipe joint as claimed in claim 1, wherein the sealing ring is integral with the auxiliary sleeve.

3. A pipe joint as claimed in claim 2, wherein the pipe sections, the auxiliary sleeve and outer sleeve are of circular cross section.

4. A pipe joint as claimed in claim 1, wherein the sealing ring is separate from the auxiliary sleeve.

5. A pipe joint as claimed in claim 4, wherein the pipe sections, the auxiliary sleeve and outer sleeve are of circular cross section.

6. A pipe joint as claimed in claim 1, including a plurality of said sealing rings which are integral with the auxiliary sleeve, the spacing of the sealing rings corresponding to the spacing of the corrugations of the pipe sections.

7. A pipe joint as claimed in claim 1, wherein the sealing ring is constituted by a hollow annular projection integral with the interior of the auxiliary sleeve.

8. A pipe joint comprising, in combination:
a pair of pipe sections of circular cross section aligned end to end, said pipe sections being of thermoplastic material and having respective corrugated end portions,
a main sleeve of heat shrinkable thermoplastic material shrunk into frictional engagement with said end portions, the sleeve conforming to the corrugations of said end portions and interlocking therewith,
an auxiliary sleeve of relatively hard thermoplastic material adapted to resist shearing forces tending to misalign the end portions of the pipe sections clamped between the main sleeve and said end portions, and
a sealing ring located within the auxiliary sleeve and positioned to provide a seal at the join between the ends of the pipe sections.

9. A pipe joint as claimed in claim 8, wherein the sealing ring is integral with the auxiliary sleeve.

* * * * *